United States Patent
Pan

(10) Patent No.: US 8,036,506 B2
(45) Date of Patent: Oct. 11, 2011

(54) MULTI-FIBER SECTION TUNABLE OPTICAL FILTER

(75) Inventor: Jing Jong Pan, Milpitas, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 206 days.

(21) Appl. No.: 12/413,266

(22) Filed: Mar. 27, 2009

(65) Prior Publication Data

US 2010/0245974 A1 Sep. 30, 2010

(51) Int. Cl.
*G02B 6/26* (2006.01)
*G01B 9/02* (2006.01)

(52) U.S. Cl. .......................................... 385/39; 356/480

(58) Field of Classification Search .................. 359/824; 385/27, 28, 39, 50; 356/480
See application file for complete search history.

(56) References Cited

U.S. PATENT DOCUMENTS

| | | | |
|---|---|---|---|
| 4,861,136 A | 8/1989 | Stone et al. | |
| 5,212,745 A | 5/1993 | Miller | |
| 5,563,973 A | 10/1996 | Miller et al. | |
| 6,904,206 B2 * | 6/2005 | Bao et al. | 385/39 |

OTHER PUBLICATIONS

Yeh, Yunhae et al., "A High-Speed Tunable Filter Using a Concave Mirror", Paper #JWA23, 2005 OFC/NFOEC, Mar. 2005, Anaheim, CA, 3 pgs.

* cited by examiner

*Primary Examiner* — William Choi
(74) *Attorney, Agent, or Firm* — Aka Chan LLP

(57) ABSTRACT

A tunable optical filter is formed by the longitudinal alignment of two opposing end sections of single-mode optical fibers. On at least one of the end sections is a collimator fiber section which is formed from a section of a graded-index, multimode optical fiber which is an odd number of quarter pitches long. The collimator fiber section has an angled end surface which joined to the reciprocally angled end surface of the at least one single-mode optical fiber end section. Piezoelectric material controls the separation between the first and second single-mode optical fiber end sections and sets the wavelengths of optical signals carried through the first and second single-mode optical fiber end sections.

21 Claims, 12 Drawing Sheets

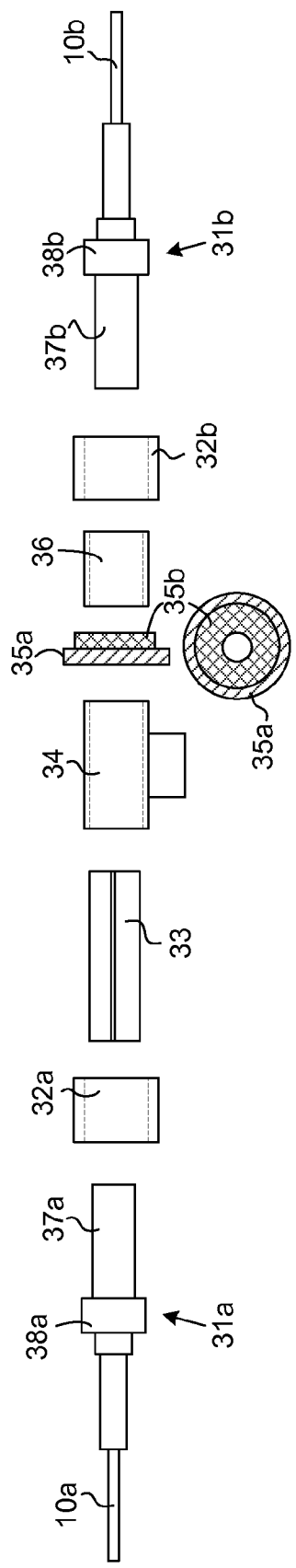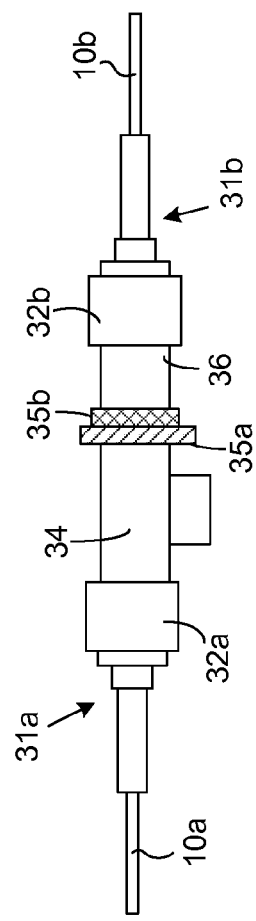
Fig. 9A
Fig. 9B

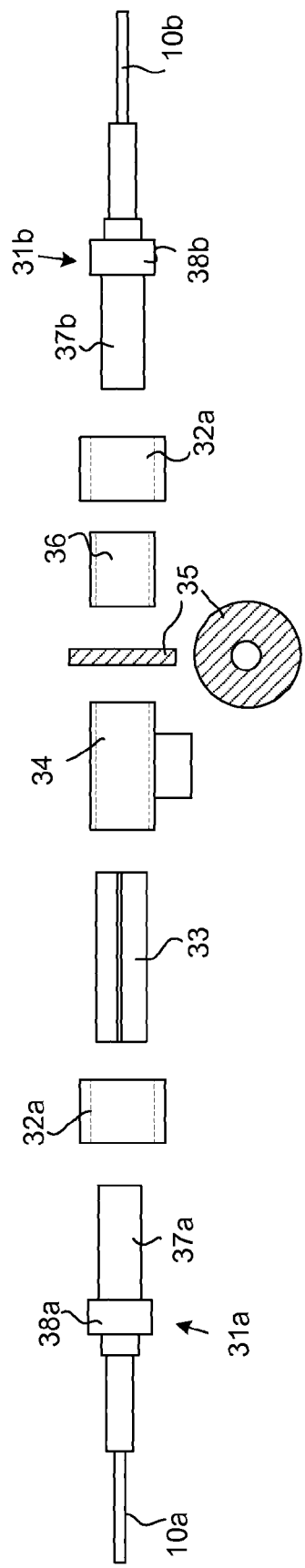
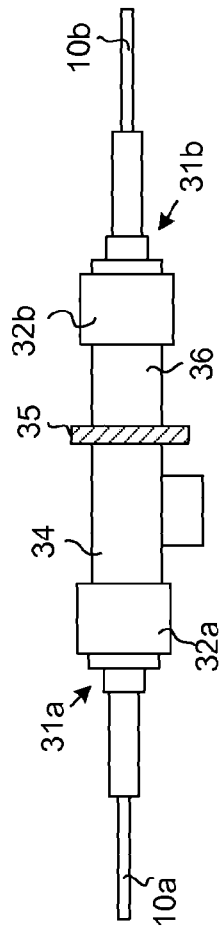
Fig. 11A
Fig. 11B

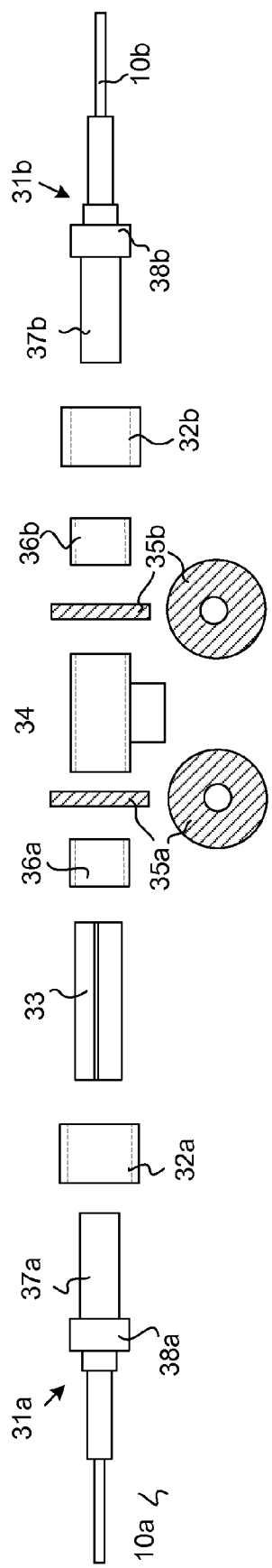
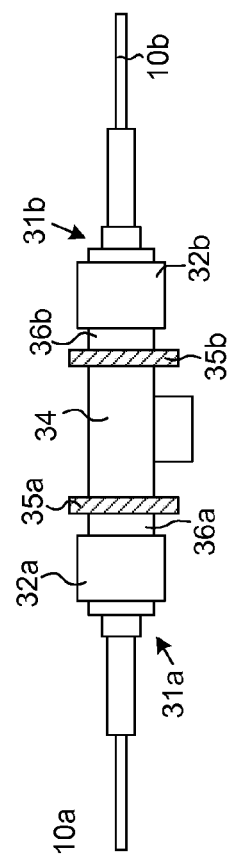
Fig. 12A
Fig. 12B

FSR = 102 nm = $\lambda^2/2nL$
Cavity Length = 11 μm

MULTI-FIBER SECTION TUNABLE OPTICAL FILTER

BACKGROUND OF THE INVENTION

This invention is related to etalon-type optical filters and, in particular, to tunable optical filters in which optical fiber ends are used to define the etalon cavity.

Optical filters which are tunable are highly desirable components for optical networks and for some optical systems, such as spectrometers, for example. Optical filters typically transmit light at particular wavelengths and block light at other wavelengths. An optical filter which is tunable allows the wavelengths to be selected.

Tunable optical filters can be quite varied in construction. For example, liquid crystal cells, thin film filters, ruled gratings, distributed Bragg reflectors (gratings), and fiber Bragg gratings, a type of distributed Bragg reflector, have been used as the tuning constituents in tunable optical filters. Of course, other parts are required to operate the tuning constituent in a tunable optical filter. The resulting optical performance, reliability, speed of operation, cost and size, among many parameters, of such tunable optical filters vary widely.

One conventional (and simple) structure for an optical filter is the etalon, also called a Fabry-Perot interferometer, in which two highly reflective, parallel surfaces form a resonating cavity for wavelength selection. To make the etalon tunable, the optical distance between the two reflecting mirrors is changed. One type of etalon, or Fabry-Perot interferometer, tunable optical filter uses the end surfaces of optical fibers as the reflecting surfaces of the etalon. However, the large numerical aperture (NA) of the optical fibers and resulting beam divergence cause a large insertion loss to the detriment of optical performance. One way of minimizing such losses is to use a concave surface at the end surface of the one of the optical fibers. Nonetheless, the insertion loss can still be lowered. These fiber-ended tunable optical filters also have significant sideband or side mode peaks in the transmission spectra which adversely affect the performance of the filters. Furthermore, current fiber etalon-type tunable optical filters remain expensive and their applications to real world problems are accordingly reduced.

The present invention is directed toward avoiding these problems, improving the optical performance of fiber etalon-type, tunable optical filters, and lowering their costs to expand their applications.

BRIEF SUMMARY OF THE INVENTION

The present invention provides for a tunable optical filter which has an end section of a first single-mode optical fiber having an end surface; an end section of a second single-mode optical fiber longitudinally aligned with the first single-mode optical fiber end section, the second single-mode optical fiber end section having an end surface facing the end surface of the first single-mode optical fiber end section; piezoelectric material controlling the separation between the first single-mode optical fiber end section and said second single-mode optical fiber end section and selecting wavelengths of optical signals carried through the end sections of the first and second single-mode optical fibers; and a collimator fiber section having a first end surface angled from a perpendicular plane to a longitudinal axis common to the at least one single-mode optical fiber end section and the collimator fiber section and joined to the end surface of the at least one single-mode optical fiber end section, the end surface of the at least one single-mode optical fiber end section reciprocally angled to the first end surface of said collimator fiber section.

The present invention further provides for the tunable optical filter with the collimator fiber section comprising a section of a multimode, graded index optical fiber which attached to at least one of the single-mode optical fiber end sections and is an odd number of quarter pitches long; the piezoelectric material comprising PMN-PT((1−x)Pb(Mg$_{1/3}$Nb$_{2/3}$)O$_{3-x}$—PbTiO$_3$)); and that the tunable optical filter includes a package assembly to hold the end sections of the first and second single-mode optical fibers, the piezoelectric material; and the collimator fiber section, the package assembly further including a TEC (thermoelectric cooler) to maintain temperature in the packaging assembly for optimum optical performance by the tunable optical filter Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 9A is an exploded view of a precision sleeve assembly which holds the two optical fiber end sections (and attached collimator fiber sections) in alignment; FIG. 9B shows the completed assembly.

FIG. 11A is an exploded view of another precision sleeve assembly with one piezoelectric ring to tune the tunable optical filter; FIG. 11B shows the completed assembly.

FIG. 12A is an exploded view of another precision sleeve assembly with two separated piezoelectric rings to tune the tunable optical filter; FIG. 12B shows the completed assembly.

It should be noted that the same reference numerals are often used in different drawings to refer to elements or parts with identical or similar functions to better explain the present invention.

DETAILED DESCRIPTION OF THE INVENTION

Figure 1:
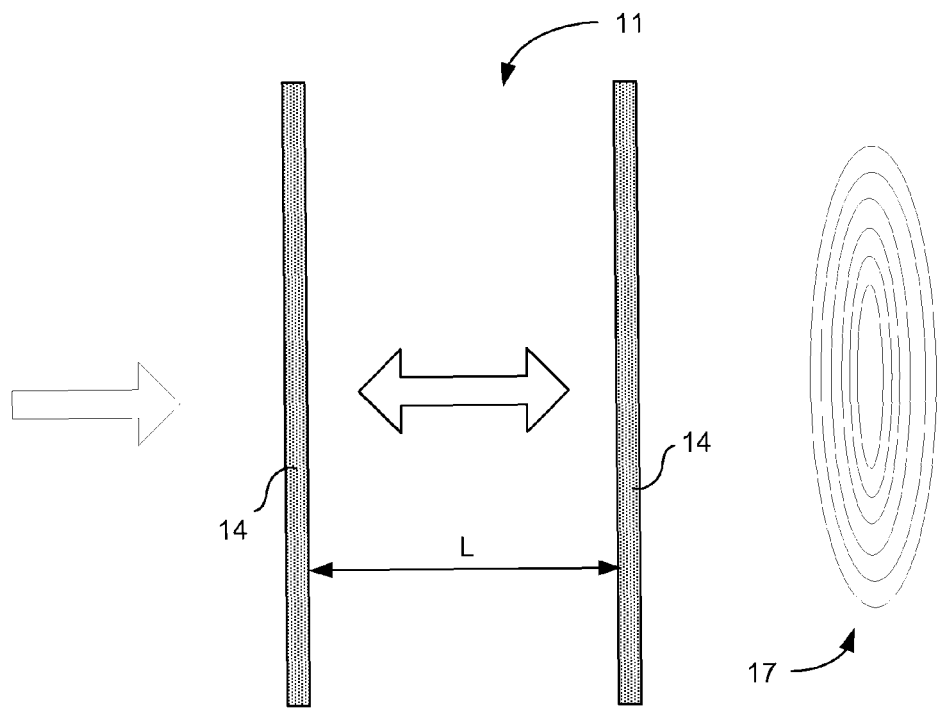
FIG. 1 is a generalized representation of an etalon or Fabry-Perot interferometer.

FIG. 1 illustrates a simplified organization of an etalon. Two parallel, highly reflecting but partially transmitting, surfaces 14, define a resonating cavity 11 in which incoming light is multiply reflected between the surfaces 14. In this example light from the left is represented by an arrow and the multiple reflections are represented by a double-headed arrow. This arrangement is well-known in optics and is the basis of the Fabry-Perot interferometer. With monochromatic light, a series of rings 17 is formed on the focal plane around the optical axis of the etalon representing constructive and destructive interference patterns of the light. These are shown as concentric rings about a central axis of the etalon. The particular interference pattern, or more specifically, the details of the interference pattern, is determined by the parameters of the etalon, including L, the separation between the surfaces 14, i.e., the length of the resonating cavity 11, the index of refraction n of the medium in the resonating cavity 11, and the wavelength $\lambda$ of the monochromatic light, and even the reflectivity R of the reflecting surfaces 14. Light with multiple wavelengths results in superimposed patterns of rings, each pattern for a wavelength.

Various arrangements have been used to adapt the device for different wavelengths of light. One classical arrangement is to vary the separation L to form a Fabry-Perot interferometer. The variation in one of the optical parameters allows the device to be "tuned" for one or more selected wavelengths. One such arrangement is to use the mirrored ends of optical fibers to define the resonating cavity of an etalon. The distance between the fiber ends is varied to select the filtered wavelength(s). A problem with this type of etalon-type tunable optical filter is that the optical fiber ends have a large numerical aperture (NA) and a large beam divergence which increase the insertion loss for the device. To counter this problem, some of the end surface(s) of the optical fiber(s) have been made concave. This ameliorates the problem to a certain extent, but there is still a considerable insertion loss. A second problem is that there are undesirable back reflection and side modes or side lobes in the transmission spectra, i.e., light is transmitted in the cladding, instead of the core, of the output optical fiber of the tunable optical filter with transmission peaks in desirable locations.

Fiber End Sections Etalon-Type Arrangements

To address these problems, the present invention provides for different etalon-type arrangements of fiber end sections. At least one of the fiber end sections has a collimator fiber section, which as the name implies, helps collimate the beam from the fiber end section and focuses the beam entering the fiber end section. The collimator fiber section also reduces back reflection and side mode or side lobe amplitudes.

Figure 2A:
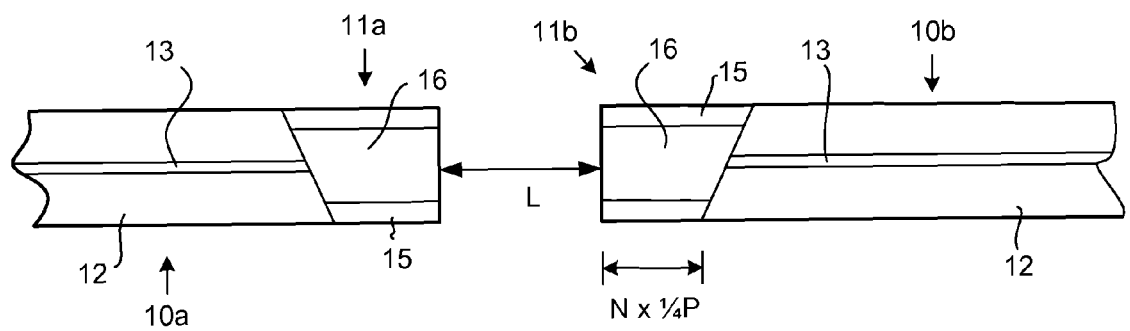
FIG. 2A shows a tunable optical filter with two optical fiber end sections, each with a collimator fiber section, according to one embodiment of the present invention.

One embodiment of the present invention which overcomes, or substantially solves, these problems is illustrated in FIG. 2A. The illustrated etalon arrangement has two optical fiber end sections 10a and 10b which face each other. The end sections 10a and 10b are the ends of single-mode optical fibers which have a core 13 of relatively small diameter, typically in a range around 9 μm, surrounded by a cladding 12 of 125 μm in diameter. Attached to each end section 10a and 10b are collimator fiber sections 11a and 11b respectively which are separated by a resonating cavity length L. The collimator fiber sections 11a and 11b are each formed from a section of a multimode optical fiber which has a core 16, typically with a diameter of 50-62.5 μm, surrounded by a cladding 15 of 125 μm in diameter. It should be understood that the numbers given here are for purposes of better describing the subject tunable optical filter and should not be considered limiting.

The multimode optical fiber from which each of the collimator fiber sections 11a, 11b is formed is a graded index, multimode fiber and each section is an odd integer of a quarter-pitch long, i.e., N×¼P, N=1, 3, 5, 7 etc. The net effect is that if one assumes that light emerging from the core 13 of the single-mode optical fiber end section 10a, 10b is a point source, the light is bent by the graded index of the core 16 so that the light leaves the collimator fiber section 11a, 11b as collimated light. In the reverse direction, collimated light entering the core 16 of the collimator section 11a, 11b is bent by the graded index and focused on the core 13 of the attached single-mode optical fiber end section 10a, 10b. Graded index, multimode fibers are readily available. For example, Corning, Inc. of Corning, N.Y., is a well-known manufacturer and supplier. The result is the collimation and focusing action of the collimator fiber sections 11a, 11b reduces the insertion loss of the resulting tunable optical filter.

Figure 2B:
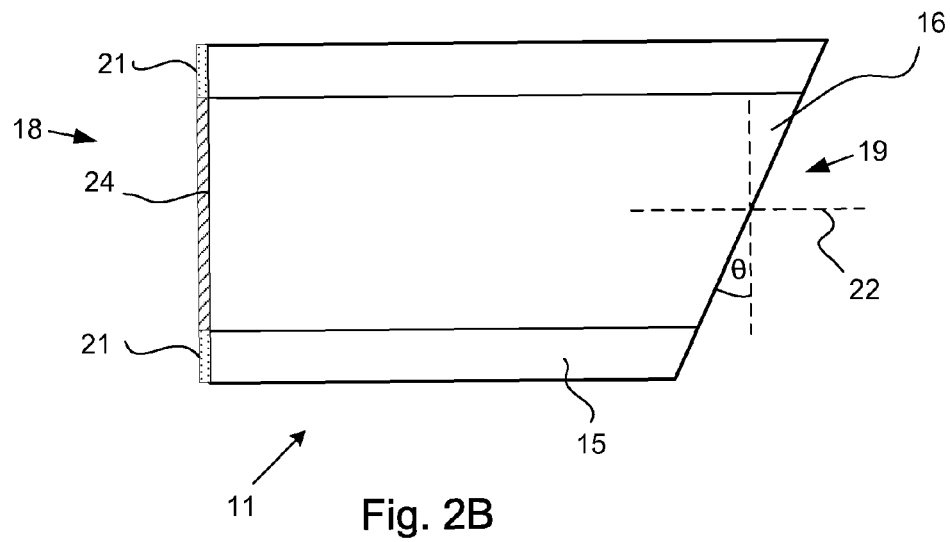
FIG. 2B shows a detailed view of a collimator fiber section in FIG. 2A.

FIG. 2B illustrates the collimator fiber sections 11a, 11b in greater detail with an example collimator fiber section 11. A flat open end surface 18 terminates one side of the collimator section 11 and an interior end surface 19 terminates the other side. The interior end surface 19 is cleaved at an angle θ from the plane perpendicular to the longitudinal axis 22 of the collimator fiber section 11. The angle is exaggerated for purposes of explanation. As shown in FIG. 2A, the end surface of the fiber end section 10a, 10b corresponding to the collimator fiber sections 11a and 11b is reciprocally slanted. The corresponding interior end surface 19 and end surface of the fiber end section are then fused together. The angled joining of the fiber end section 10a, 10b to the collimator fiber sections 11a, 11b reduces back reflection and side modes or side lobes in the transmission spectra of the tunable optical filter. In particular, the angled joining of the collimator fiber section on the output side of the resonating cavity helps to block back reflection and reduces side modes or lobes which is caused by light in the cladding 15 of the collimator fiber section by reflecting such light away. It has been found that angles with θ greater than 6° work better and a range of 8° to 15° is believed to be optimum.

The open end surface 18 of the collimator fiber section 11 is covered by a high reflectance layer 20 and an anti-reflection layer 21. The high reflectance layer 20 formed from dielectric material covers the core portion and the anti-reflection layer 21 covers the cladding portion of the open end surface 18. Deposition and photoresist masking techniques are used to create the layers 20 and 21. The anti-reflection layer 21 minimizes undesirable back reflection and also reduces side mode transmission.

Figure 3A:
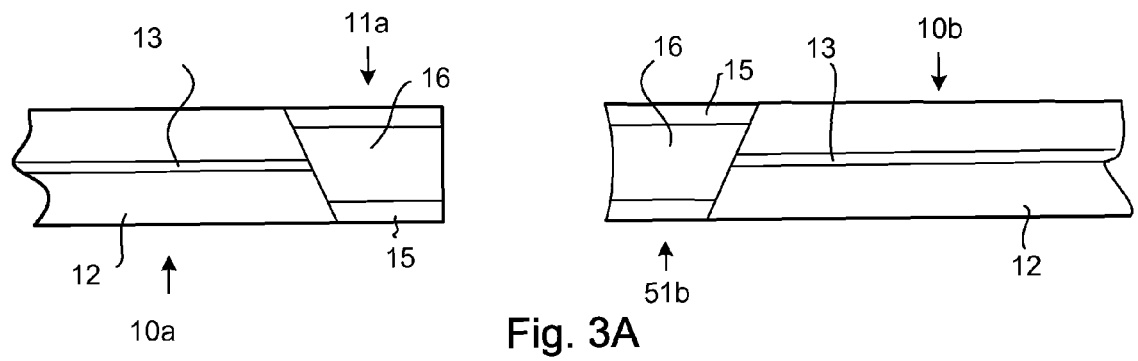
FIG. 3A shows a tunable optical filter with two optical fiber end sections, each with a collimator fiber section and one of the collimator fiber sections having a concave open end surface, according to one embodiment of the present invention.
Figure 3B:
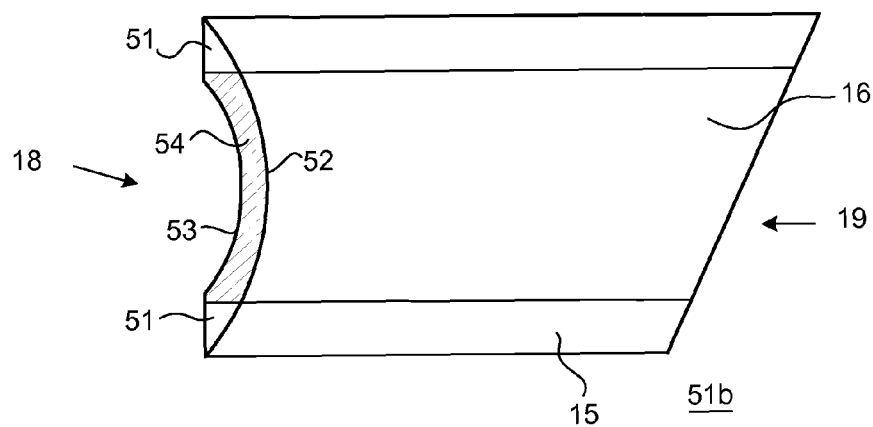
FIG. 3B shows a detailed view of the FIG. 3A collimator fiber section collimator having a concave open end surface.

FIGS. 3A and 3B show another embodiment of the present invention. In this fiber etalon arrangement the fiber end section 10a and collimator fiber section 11a are the same as previously described in FIG. 2A. But instead of the collimator fiber section 11a, a collimator fiber section 51b having a concave open end surface 18 is attached to the fiber end section 10b. Shown in greater detail in FIG. 3B, the section 51b is formed from a graded index, multimode optical fiber and is N×¼P long, where N is an odd integer, for collimation and focusing functions as described previously. Its interior end surface 19 is angled as described previously, but its open end surface 18 is concave. Specifically, the open surface 18 of the collimator fiber section 51b is formed by polishing with a convex polishing surface to create a concave end surface 52. Then a layer 51 of anti-reflection material is deposited over the cladding portion and a high reflectance, dielectric material layer 54 is deposited over the core portion of the end surface 52 with photoresist masking techniques. A concave surface 53 is created in the high reflectance layer 54 by polishing with the convex polishing surface to create a concave end surface 53. The concavity of the end surfaces 52 and 53 is set by empirically adjusting the softness of the polishing surface and controlling the pressure of the polishing surface upon the polished surface 52, 53. Gravity may be used for pressure control by selecting the weight of a polishing fixture which holds the polishing surface tool against the polished surface below.

The resulting concavity of the collimator fiber section 51b is useful in minimizing beam divergence if the action of the quarter-pitch (or odd multiple integer of a quarter-pitch) of the collimator fiber section is not sufficient.

Figure 4:
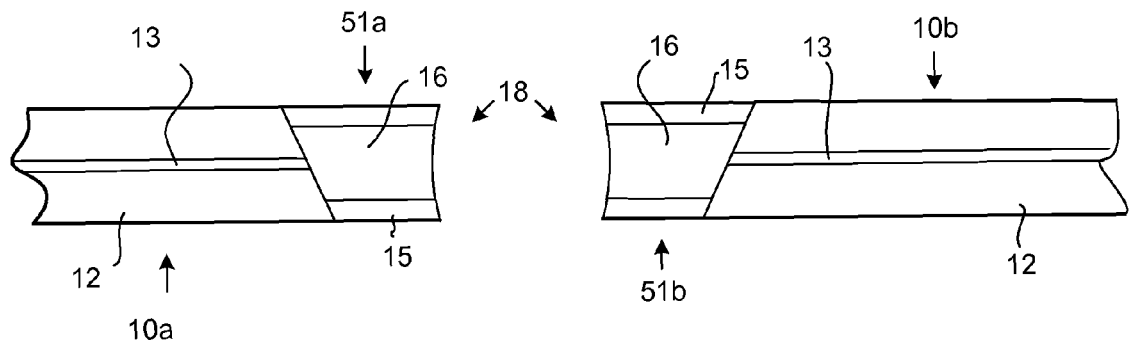
FIG. 4 shows a tunable optical filter with two optical fiber end sections, each with an collimator fiber section with a concave open surface, according to an embodiment of the present invention.

Another arrangement of the fiber etalon according to the present invention is illustrated in FIG. 4. In this embodiment the left collimator fiber section 11a is replaced with a collimator fiber section 51a which has a concave open end surface 18 as shown in FIG. 3B. The open end surfaces of both collimator fiber sections 51a, 51b are concave.

Figure 5A:
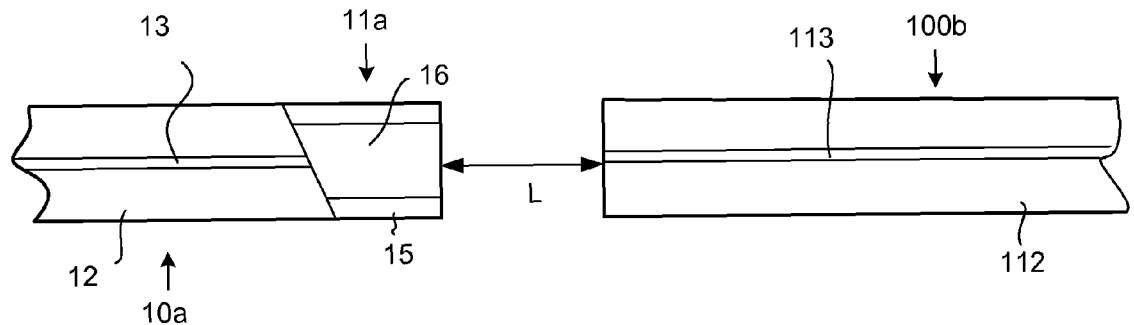
FIG. 5A shows a tunable optical filter with two optical fiber end sections, only one end section has a collimator fiber section, according to an embodiment of the present invention.
Figure 5B:
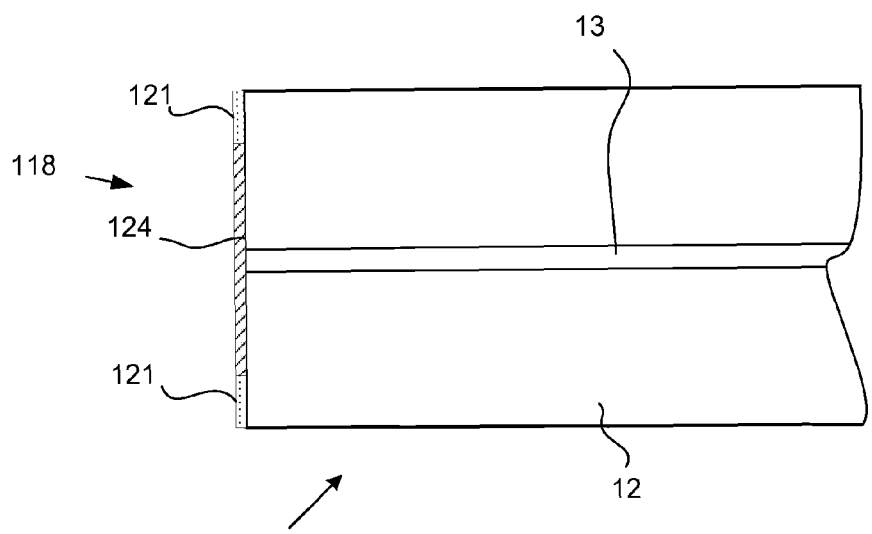
FIG. 5B shows the details of the end surface of the FIG. 5A optical fiber end section without the collimator fiber section.
Figure 6:
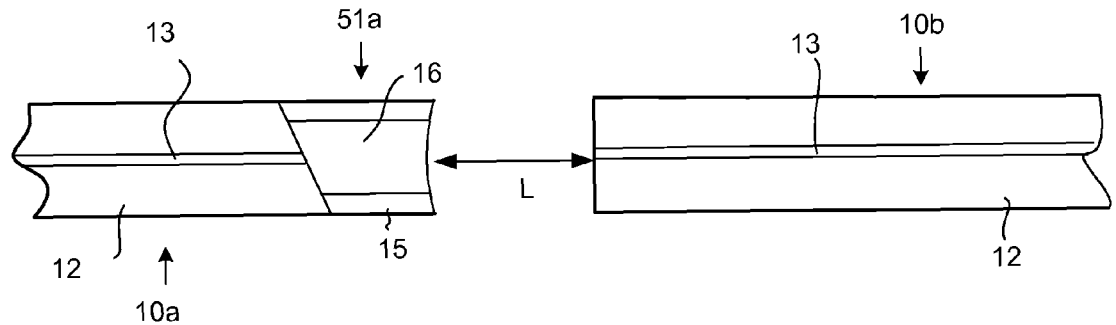
FIG. 6 shows a tunable optical filter assembly with two optical fiber end sections, only one end section has a collimator fiber section and that section has a concave open end surface.

FIG. 5A illustrates another embodiment of the present invention in which one of the collimator fiber sections 11 of the FIG. 2A arrangement is not used. That is, the left optical fiber end section 10a is attached to the collimator fiber section 11a, but the right optical fiber end section 10b does not have a collimator fiber section 11. The end surface 118 of the single-mode fiber end section 10b is flat and perpendicular to the longitudinal axis of the section 100b, as illustrated in FIG. 5B. The core 13 and most of the cladding 12 surrounding the core 13 at the end surface 118 is covered by a high-reflectance layer 124 and the cladding 12 near the edge of the end surface 118 is covered by an anti-reflection layer 121. This is done in the same manner as described with respect to FIG. 2B. It should be noted that output side of the fiber etalon-type arrangement is the left fiber end section 10a since it carries the angled splice to the collimator fiber section 11a. Another embodiment of the present invention is shown in FIG. 6. Here the collimator fiber section 11a of FIG. 3A is replaced by the collimator fiber section 51a which has a concave end surface.

Figure 7A:
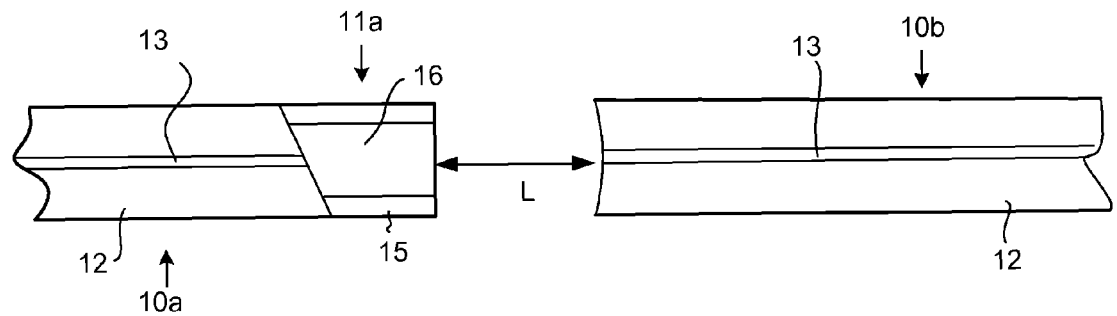
FIG. 7A shows another tunable optical filter assembly with two optical fiber end sections, only one section has a collimator fiber section. The end surface of the other end optical fiber end section is concave and is illustrated in detail in FIG. 7B.
Figure 7B:
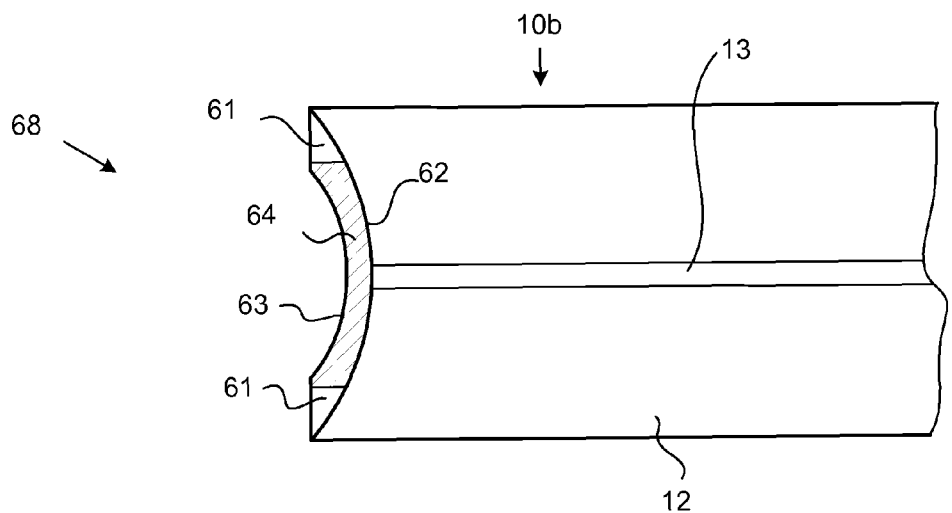

FIG. 7A illustrates another embodiment of the present invention. But instead of the flat end surface 118 of the right fiber end section 10b of FIGS. 5A and 5B, the section 10b of FIG. 7B has a concave end surface 68. As shown in FIG. 7B, the end surface 68 is formed by first being polished with a convex polishing surface to create a concave end surface 62. Then a layer 61 of anti-reflection material is deposited over the cladding portion and a high reflectance, dielectric material layer 64 is deposited over the core portion of the end surface 62. A concave surface 63 is created in the high reflectance layer 64 by polishing with the convex polishing surface to create a concave end surface 63.

Figure 8:
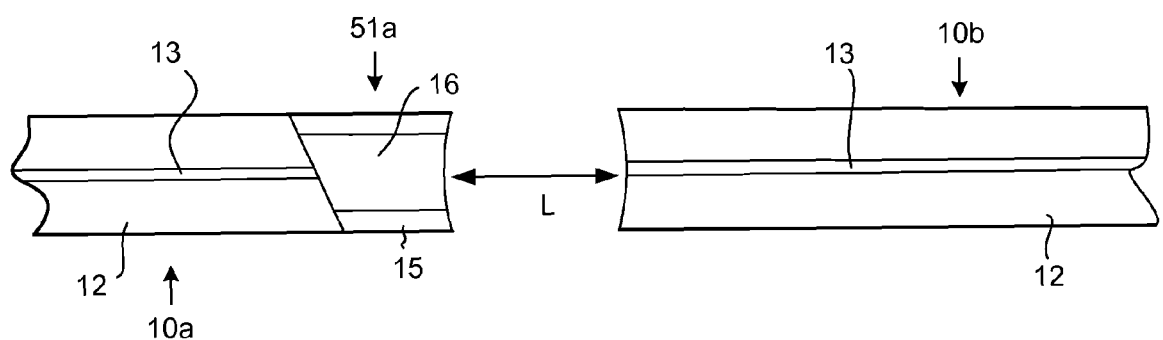
FIG. 8 shows another tunable optical filter assembly with two optical fiber end sections, only one section has a collimator fiber section. The open end surface of the collimator fiber section and the end surface of the other end optical fiber end section are both concave.

FIG. 8 shows still another arrangement of optical fiber end sections 10a and 10b. The left optical fiber end section 10a is attached to a collimator fiber section 51a with a concave end surface 18 (see FIG. 3B). The right optical fiber end section 10b terminates with a concave end surface 68 (see FIG. 7B). Again it should be noted that some of the described arrangements have a collimator fiber section on only one single-mode optical fiber end section. Hence the output side of the fiber etalon-type arrangements of FIG. 6 (and FIGS. 7A and 8) is the left fiber end section 10a since that section has the angled splice of the collimator fiber section 51a (and 11a and 51a).

Precision Sleeve Assembly to Hold Fiber Etalon Arrangement and Package Assembly

The fiber end sections 10a, 10b and their corresponding collimator fiber sections 11a, 11b of the fiber etalon arrangements described above are held in alignment by a precision sleeve assembly shown in FIGS. 9A and 9B which provides for proper guidance for the optical fiber end sections and their collimator fiber sections, if any. FIG. 9A shows the assembly in an exploded view. The fiber ferrule subassemblies 31a, 31b respectively hold the fiber end sections 10a, 10b and the collimator fiber sections 11a, 11b. An alumina sleeve 33 having a lengthwise cut fits firmly over the internal ferrules 37a, 37b of the fiber ferrule subassemblies 31a, 31b. Metal tubes 32a, 32b fit over the shoulders 38a, 38b of the fiber ferrule subassemblies 31a, 31b and over parts of a first metal holder 34 and second metal holder 36. The completed sleeve assembly is shown in FIG. 3B. Precision sleeve assemblies and their parts are available from Seikon Giken Co. of Matsudo City, Chiba, Japan.

Two piezoelectric disk rings 35a, 35b, also shown in a frontal view with central openings, are mounted between the first and second holders 34 and 36. Depending upon the voltages across the disks, the piezoelectric disks 35a, 35b expand and contract along the longitudinal axis of the sleeve assembly to drive fiber ferrule subassemblies 31a, 31b apart or together. The length L of the resonance cavity of the etalon is thus set or "tuned." Electric leads which carry voltages to the disks 35a, 35b are not shown in the drawings. Though the two disk rings 35a, 35b are shown as assembled together, the two rings 35a, 35b are electrically driven separately to obtain the maximum displacement per volt. Furthermore, it is preferable that the rings 35a, 35b comprise comprises PMN-PT $((1-x)Pb(Mg_{1/3}Nb_{2/3})O_{3-x}$—$PbTiO_3))$. Compared to other piezoelectric materials, such as PZT and PLZT, PMN-PT has a greater displacement per volt and faster tuning speeds.

Figure 10:
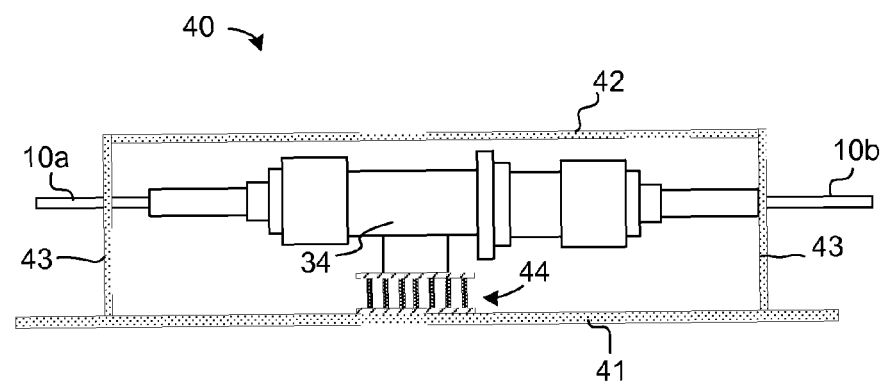
FIG. 10 is a cross-sectional view of the packaged assembly of the tunable optical filter, according to an embodiment of the present invention.

Finally, the completed sleeve assembly 30 is mounted into a package assembly 40 shown in FIG. 10. The package assembly has a base 41 with a top 42 and sides 43 which enclose and protect the sleeve assembly 30. To ensure temperature stability the base portion of the holder 34 is mounted on the top of a TEC (thermoelectric cooler) 44) which in turn is mounted on the base 41. In response to a temperature-monitoring sensor (not shown), the TEC 44 maintains the sleeve assembly 30 and the enclosed etalon in a temperature range for optimum optical performance by the tunable optical filter. The package assembly 40 is miniaturized, not more than 4.5 cm long×1.8 cm wide×1.4 cm high. Installation is easy, yet optical performance is high.

FIGS. 11A, 11B and 12A, 12B illustrate alternative precision sleeve assemblies. FIG. 11A shows an exploded view of a precision sleeve assembly with only one piezo-electric disk ring 35; FIG. 11b shows the completed sleeve assembly. FIG. 12A shows an exploded view of a precision sleeve assembly with only two piezo-electric disk rings 35A, 35B which are separated; FIG. 12b shows the completed sleeve assembly.

Some Empirical Results of the Tunable Optical Filters

Figure 13A:
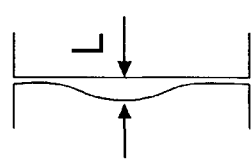
FIGS. 13A-D are plots of power in dB versus wavelength for different fiber etalon arrangements.
Figure 13A:
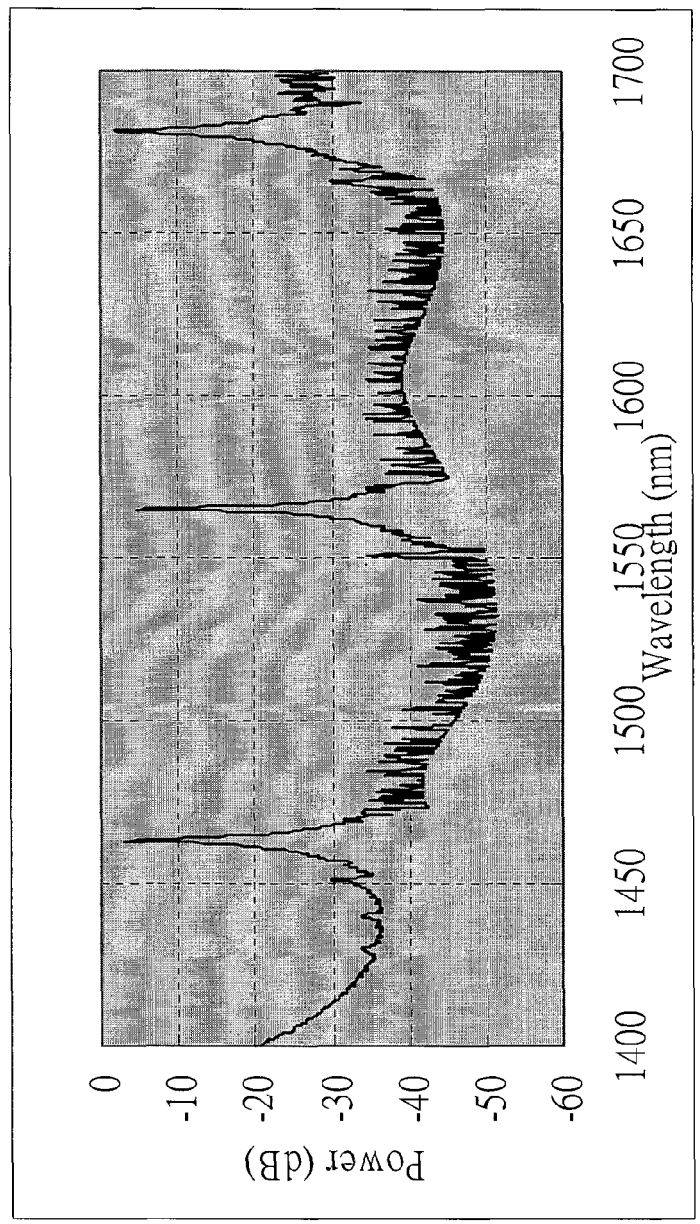
Figure 13B:
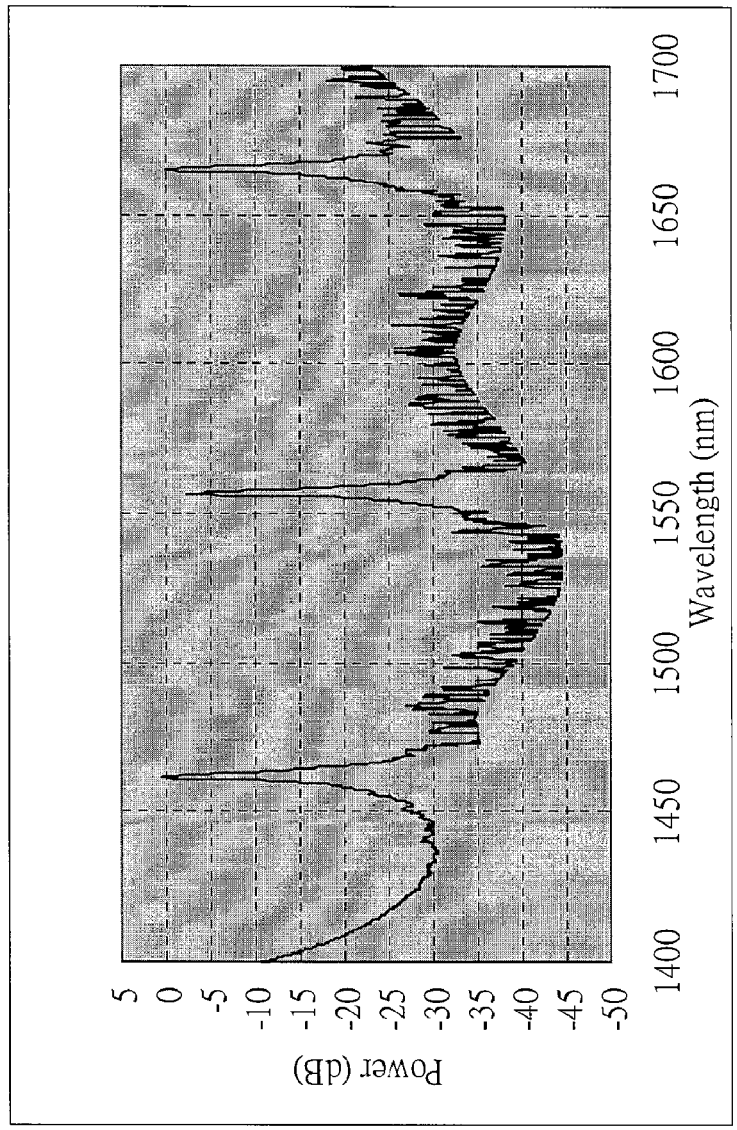
Figure 13C:
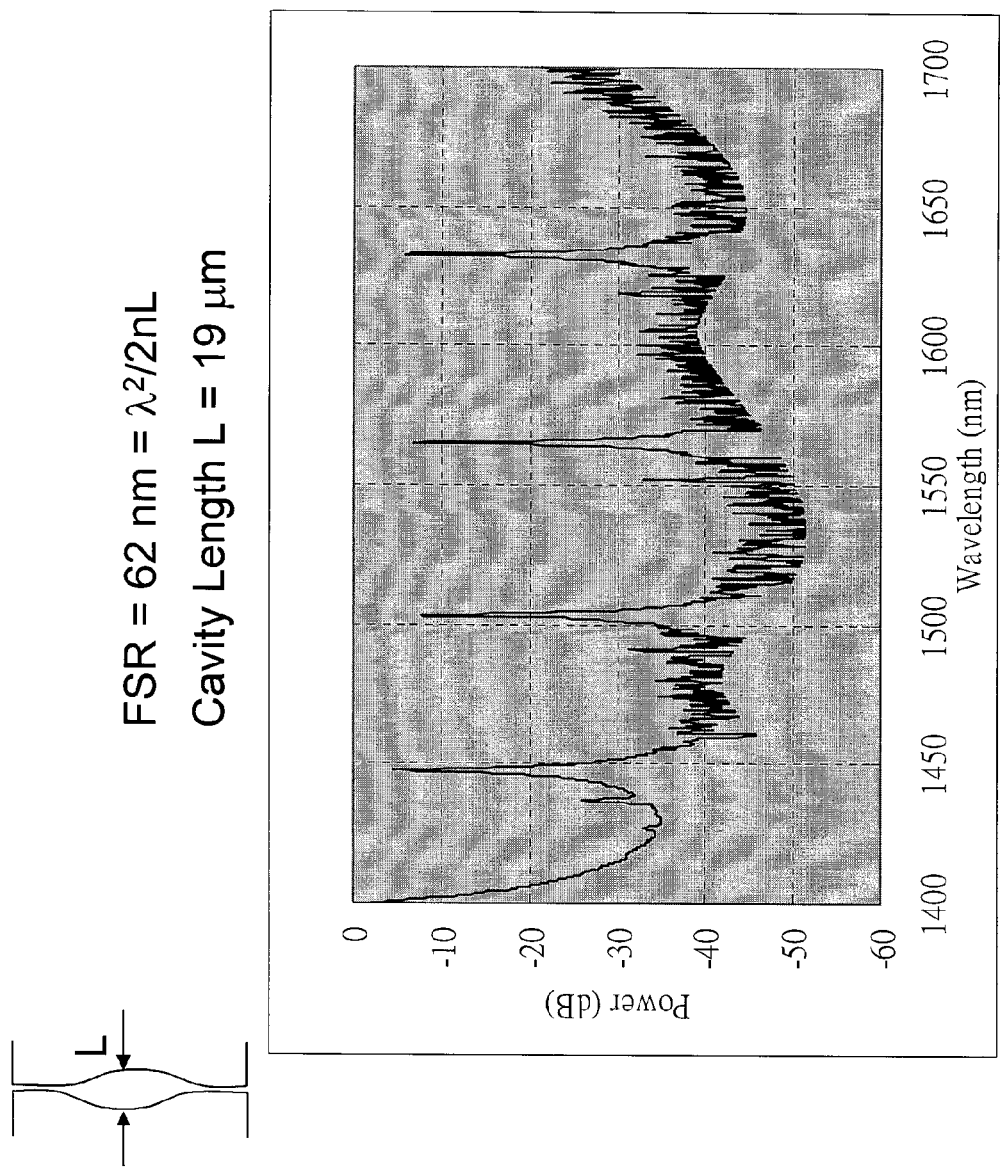
Figure 13D:
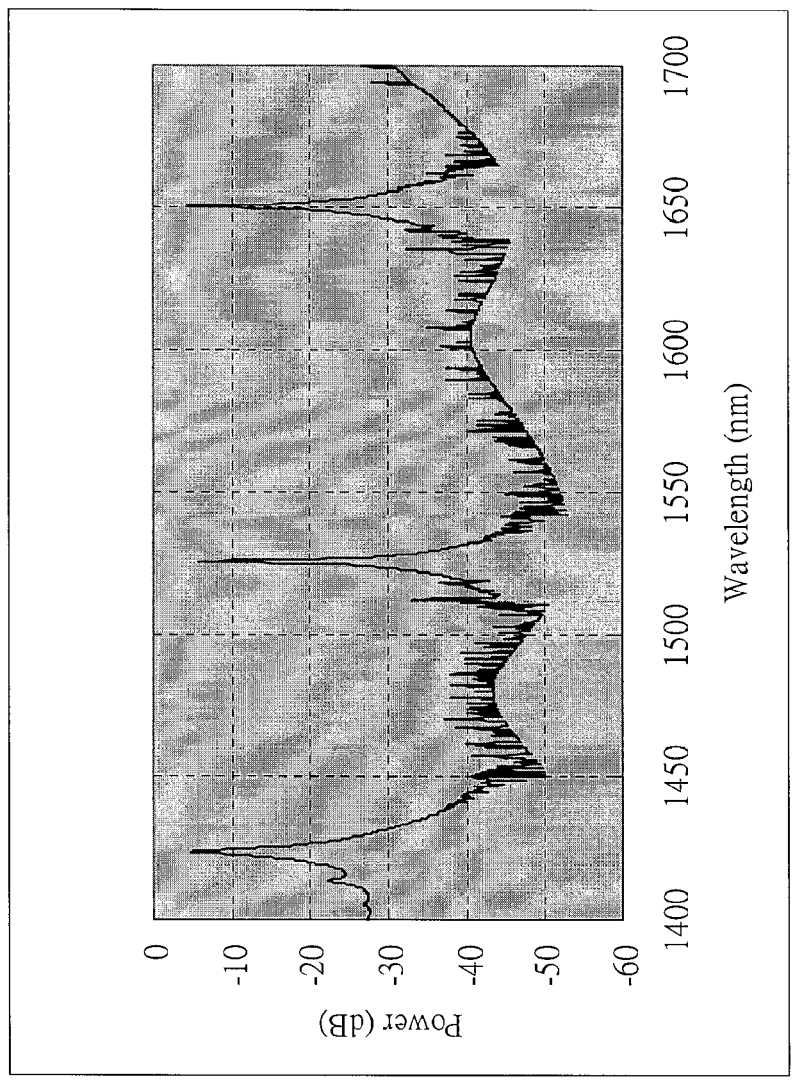

FIG. 13A illustrates a plot of power in dB versus wavelength for a fiber etalon arrangement illustrated by FIG. 6. The plot shows the performance of the arrangement with a free spectral range (FSR) of 102 nm and a cavity length L of 11 μm. FIG. 13B illustrates a plot of power versus wavelength for a FIG. 6 fiber etalon arrangement. With an FSR of 95 nm, an insertion loss of less than 5 dB was found and a side-lobe suppression ratio (SSR) of 30 dB was found. FIG. 13C illustrates a plot of power versus wavelength for a FIG. 8 fiber etalon arrangement. The plot shows the performance of the arrangement with an (FSR) of 62 nm and a cavity length L of 19 μm. Likewise, FIG. 13D shows the performance of a FIG. 8 fiber etalon arrangement with FSR about 120 nm and an SSR of about 28 dB.

Hence the present invention provides a fiber etalon-type tunable optical filter which has high optical performance and is relative cheap compared to similar tunable optical filters and is miniaturized for easy installation.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A tunable optical filter comprising:
    an end section of a first single-mode optical fiber having an end surface;
    an end section of a second single-mode optical fiber longitudinally aligned with said first single-mode optical fiber end section, said second single-mode optical fiber end section having an end surface facing said end surface of said first single-mode optical fiber end section;
    piezoelectric material controlling the separation between said first single-mode optical fiber end section and said second single-mode optical fiber end section and selecting wavelengths of optical signals carried through said end sections of said first and second single-mode optical fibers; and
    a collimator fiber section having a first end surface angled from a perpendicular plane to a longitudinal axis common to said at least one single-mode optical fiber end section and said collimator fiber section and joined to said end surface of said at least one single-mode optical fiber end section, said end surface of said at least one single-mode optical fiber end section reciprocally angled to said first end surface of said collimator fiber section.

2. The tunable optical filter of claim 1 wherein said collimator fiber section comprises a section of a multimode, graded index optical fiber attached to at least one of said single-mode optical fiber end sections, said multimode, graded index optical fiber section an odd number of quarter pitches long.

3. The tunable optical filter of claim 2 wherein said first end surface of said multimode, graded index optical fiber section is angled sufficiently from said perpendicular plane to said longitudinal axis common to said at least one single-mode optical fiber end section and said multimode, graded index optical fiber section to deflect away light not focused on a core of said at least one single-mode optical fiber.

4. The tunable optical filter of claim 3 wherein said first end surface of said multimode, graded index optical fiber section is angle-cleaved at least 6° from said perpendicular plane, and said end surface of said at least one single-mode optical fiber end section is reciprocally angle-cleaved to said first end surface of said multimode, graded index optical fiber section, and the said first end surface of said multimode, graded index optical fiber section fused to said end surface of said at least one single-mode optical fiber end section.

5. The tunable optical filter of claim 2 wherein a collimator fiber section is attached to said first single-mode optical fiber end section only.

6. The tunable optical filter of claim 5 wherein said multimode, graded index optical fiber section has an open end surface opposite said first end surface, said open end surface flat and in said perpendicular plane to said longitudinal axis common to said corresponding single-mode optical fiber end section and said multimode, graded index optical fiber section.

7. The tunable optical filter of claim 5 wherein said multimode, graded index optical fiber section has an open end surface opposite said first end surface, said open end surface concave.

8. The tunable optical filter of claim 5 wherein said multimode, graded index optical fiber section has an open end surface opposite said first end surface, said open end surface flat and in said perpendicular plane to said longitudinal axis common to said corresponding single-mode optical fiber end section and said multimode, graded index optical fiber section, and wherein said second single-mode optical fiber section has an open end surface opposing said multimode, graded index optical fiber section open end surface, said second single-mode optical fiber section open end surface concave.

9. The tunable optical filter of claim 5 wherein said multimode, graded index optical fiber section has an open end surface opposite said first end surface, said open end surface concave, and wherein said second single-mode optical fiber section has an open end surface opposing said multimode, graded index optical fiber section open end surface, said second single-mode optical fiber section open end surface concave.

10. The tunable optical filter of claim 5 wherein said multimode, graded index optical fiber section has a core and a surrounding cladding and an open end surface opposite said first end surface, a high reflectance layer covering a core portion of said open end surface and an anti-reflection layer covering a cladding portion of said open end surface; and wherein said second single-mode optical fiber section has a core and surrounding cladding and an open end surface opposing said multimode, graded index optical fiber section open end surface, a high reflectance layer covering a core portion and part of a cladding portion of said open end surface and an anti-reflection layer covering a part of said cladding portion at a periphery of said open end surface.

11. The tunable optical filter of claim 1 wherein a collimator fiber section is attached to each of said first and second single-mode optical fiber end sections, each collimator fiber section comprising a multimode, graded index optical fiber end section.

12. The tunable optical filter of claim 11 wherein each of said multimode, graded index optical fiber sections has an open end surface opposite said first end surface, and said open end surfaces of each of said multimode, graded index optical fiber sections are flat and in said perpendicular plane to said longitudinal axis common to said corresponding single-mode optical fiber end section and said multimode, graded index optical fiber section.

13. The tunable optical filter of claim 11 wherein each of said multimode, graded index optical fiber sections has an open end surface opposite said first end surface, an open end surface of one of said multimode, graded index optical fiber sections flat and in said perpendicular plane to said longitudinal axis common to said corresponding single-mode optical fiber end section and said multimode, graded index optical fiber section, and an open end surface of the other of said multimode, graded index optical fiber sections concave.

14. The tunable optical filter of claim 11 wherein each of said multimode, graded index optical fiber sections has an open end surface opposite said first end surface, and said open end surfaces of each of said multimode, graded index optical fiber sections are concave.

15. The tunable optical filter of claim 11 wherein each of said multimode, graded index optical fiber sections has a core and a surrounding cladding and an open end surface opposite said first end surface, a high reflectance layer covering a core portion of said open end surface and an anti-reflection layer covering a cladding portion of said open end surface.

16. The tunable optical filter of claim 1 wherein said piezoelectric material comprises PMN-PT($(1-x)$Pb(Mg$_{1/3}$Nb$_{2/3}$)O$_{3-x}$—PbTiO$_3$)).

17. The tunable optical filter of claim 1 further comprising a package assembly to hold said end sections of said first and second single-mode optical fibers, said piezoelectric material; and said collimator fiber section, said package assembly further including a TEC (thermoelectric cooler) to maintain temperature in said packaging assembly for optimum optical performance by said tunable optical filter.

18. A tunable optical filter comprising:
an end section of a first single-mode optical fiber having an end surface;
an end section of a second single-mode optical fiber longitudinally aligned with said first single-mode optical fiber end section, said second single-mode optical fiber end section having an end surface facing said end surface of said first single-mode optical fiber end section;
PMN-PT($(1-x)$Pb(Mg$_{1/3}$Nb$_{2/3}$)O$_{3-x}$—PbTiO$_3$)) piezoelectric material controlling the separation between said first single-mode optical fiber end section and said second single-mode optical fiber end section and selecting wavelengths of optical signals carried through said end sections of said first and second single-mode optical fibers; and
a collimating section of a multimode, graded index optical fiber attached to at least one of said single-mode optical fiber end sections, said collimating multimode, graded index optical fiber section having a first end surface angled from a perpendicular plane to a longitudinal axis common to said at least one single-mode optical fiber end section and said collimating multimode, graded index optical fiber section and joined to said end surface of said at least one single-mode optical fiber end section, said end surface of said at least one single-mode optical fiber end section reciprocally angled to said first end surface of said collimating multimode, graded index optical fiber section.

19. The tunable optical filter of claim 18 further comprising a package assembly to hold said end sections of said first and second single-mode optical fibers, said PMN-PT piezoelectric material; and said collimating multimode, graded index optical fiber section, said package assembly further including a TEC (thermoelectric cooler) to maintain temperature in said packaging assembly for optimum optical performance by said tunable optical filter.

20. The tunable optical filter of claim 18 wherein said collimating section of multimode, graded index optical fiber is an odd number of quarter pitches long.

21. The tunable optical filter of claim 18 wherein said first end surface of said collimator multimode, graded index optical fiber section is angled at least 6° from said perpendicular plane to said longitudinal axis common to said at least one single-mode optical fiber end section and said collimator multimode, graded index optical fiber section to deflect away light not focused on a core of said at least one single-mode optical fiber.

* * * * *